United States Patent [19]

Doherty

[11] Patent Number: 5,380,021
[45] Date of Patent: Jan. 10, 1995

[54] MOBILE KNEE SUPPORT APPARATUS

[76] Inventor: David B. Doherty, 1287 Plymouth Pl., Jacksonville, Fla. 32205

[21] Appl. No.: 86,558

[22] Filed: Jul. 1, 1993

[51] Int. Cl.$^6$ .................................. A01D 67/04
[52] U.S. Cl. ........................... 280/32.5; 280/32.6; D34/23
[58] Field of Search ............... 280/32.5, 32.6, 32, 280/87.04; D34/23

[56] References Cited

U.S. PATENT DOCUMENTS

| D. 303,309 | 9/1989 | Pulda, Jr. et al. | D34/23 |
| D. 330,957 | 10/1992 | Contrini | D34/23 |
| 718,875 | 1/1903 | Pettersen | 280/32.5 |
| 1,348,683 | 8/1920 | Aldenbruck et al. | 280/32.5 |
| 1,368,716 | 2/1921 | Gontrum | 280/32.6 |
| 2,291,094 | 7/1942 | McCarthy | 280/22.6 |
| 2,318,059 | 5/1943 | Cooper | 280/32.5 |
| 2,448,427 | 8/1948 | Gordon | 280/32.5 |
| 2,480,406 | 8/1949 | Forney | 280/32.5 |
| 2,484,494 | 10/1949 | Ferguson | 280/32.6 X |

OTHER PUBLICATIONS

Advertisement for "Brookstone" stores date unknown.

Primary Examiner—Mitchell J. Hill
Assistant Examiner—Christopher P. Ellis
Attorney, Agent, or Firm—Arthur G. Yeager

[57] ABSTRACT

A sheet material sling is supported on a horseshoe-shaped device mounted on three casters which forms a vehicle to support a knee of a user. Two such supports are used, unconnected to each other by users who must kneel in their work and must scoot along a support surface. Provisions are made for the supports to be interconnected by a flexible connector or by a rigid table like sheet.

20 Claims, 3 Drawing Sheets

MOBILE KNEE SUPPORT APPARATUS

BACKGROUND OF THE INVENTION

Many jobs require a worker to be on his or her hands and knees and after a short time of this type of work, the knees begin to be painful. In the past such workers have equipped themselves with pillows or with knee pads which strap onto the leg or are held in place by elastic bands. These devices ease the pain or postpone the time for pain to begin, but, in general, do not provide long term relief.

It is an object of the present invention to provide a sheet material sling or hammock for each knee and to mount the sling or hammock on a wheeled frame so as to provide mobility in the kneeling position. It is another object of this invention to provide such a device with pockets or pouches to hold tools or other small items, such as nails, rivets, etc. that might be used by the worker. Still another object of this invention is to provide a means for joining two knee supports in a fixed or semifixed spacing. Other objects will become apparent from the more detailed description which follows.

BRIEF SUMMARY OF THE INVENTION

This invention relates to a pair of mobile knee supports comprising two identical wheeled vehicles, each designed to receive and support a human knee; each said support including an outer U-shaped strip and an inner U-shaped strip spaced concentrically apart, three spaced casters located respectively, at the center of said strips and at both ends of said strips; a rigid support for each said caster depending downwardly from at least one of said strips; and a flexible knee support sheet material suspended from said inner strip and adapted to receive said knee and to suspend the knee above the lowest level of said casters.

In a specific and preferred embodiment of the invention each caster is supported by, and attached to, a horizontal leg of a short section of an L-beam while the vertical leg of the beam section is rigidly fastened to the inner strip. In another embodiment a pocket or pouch is suspended between adjacent portions of the inner and outer strips for the purpose of holding small tools or other items needed by the worker. In still other embodiments two of the knee supports are temporarily attached to a single plate or board which permits the individual supports to be moved about as a pair which are spaced apart the desired distance for normal use. Similarly, a pair of knee supports of this invention may be tied together with one or more ropes tied to eyebolts on the knee supports.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
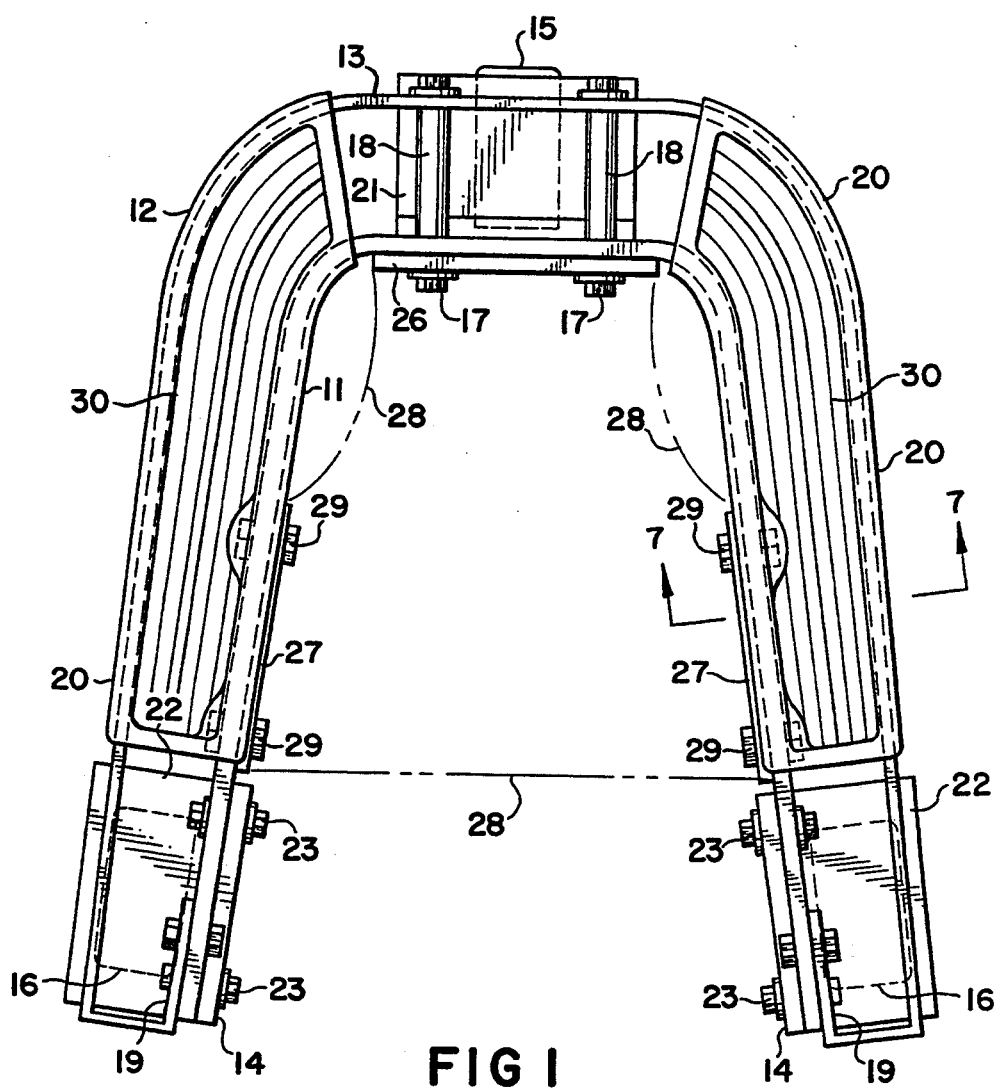
FIG. 1 is a top plan view of a knee support of this invention.
Figure 2:
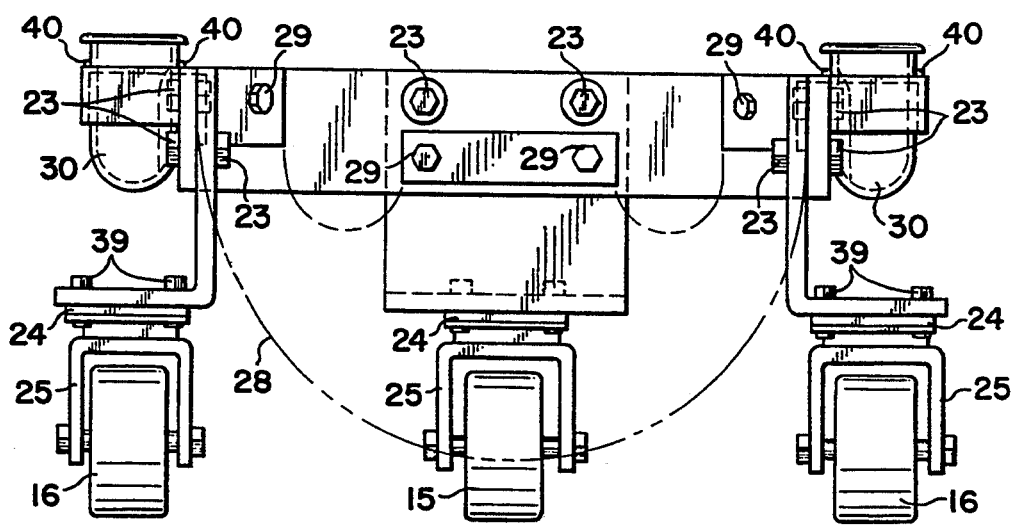
FIG. 2 is a rear elevational view of a knee support of this invention.
Figure 3:
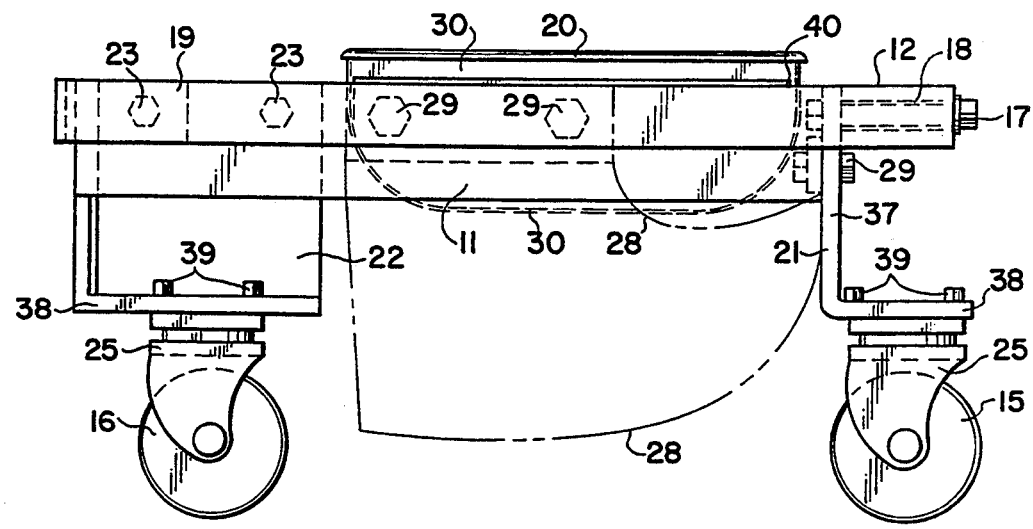
FIG. 3 is a side elevational view of a knee support of this invention.

The invention and its structure are best understood by reference to the accompanying drawings.

In FIGS. 1–3 and 7 there are shown the features of the knee support of this invention. The general theme of this invention is to provide a pair of wheeled vehicles for supporting a workers knees when he or she is kneeling. Each knee is supported above the floor on which the device rolls. This makes kneeling much easier on the worker, who need not rise and kneel when moving about, and, furthermore, each knee is supported in a sling which conforms to the contours of each knee and, thus, prevents the formation of any painful locations that occur when a knee is pressed against a hard surface.

The main supporting framework of the device comprises two spaced U-shaped, or horseshoe-shaped, strips; namely, inner strip 11 and outer strip 12, which are generally rectangular in cross-section and are positioned with the long axis of the rectangle in the vertical direction so as to provide as much resistance as possible to sagging or bending in the vertical direction. Inner strip 11 carries most of the stresses resulting from supporting approximately half of a worker's weight, and, accordingly, is larger than outer strip 12. For a normal size worker, inner strip 11 may be about $\frac{1}{4} \times 1\frac{1}{2}$ inches in cross-section while outer strip 12 may be about $\frac{1}{8} \times \frac{3}{4}$ inch in cross-section. These two strips 11 and 12 are spaced apart about 1–2 inches, preferably 1½ inches, and held in that spacing by tubular spacers 18 and bolts 17 at the front portion 13 of the device. These dimensions are, of course, only illustrative, and other sizes and shapes may be useful in other embodiments. At the rear portion 14 of the device, the spacing is maintained by bending outer strip 12 twice to form a return bend 19 that is bolted to inner strip 11 by one of bolts 23.

At each spacer location 18 and 19 there is a short section of L-beam 21 or 22 having a vertical leg 37 which is attached by bolts 23 to inner strip 11 so as to have horizontal legs 38 of all L-beams 21 and 22 lie in a common horizontal plane. Each horizontal leg 38 forms a supporting surface to which is bolted the mounting plate of a caster 15 or 16 by means of bolts 39. Each caster 15 and 16 includes a yoke 25 which is mounted on a ball bearing plate so as to permit 360° rotation of caster yoke 25 and thus permit casters 15 and 16 to roll in any direction. L-beam sections 21 and 22 are positioned so as to have horizontal legs 38 spaced below strips 11 and 12. For normal sizes, the top surface of strips 11 and 12 is about 4–5 inches above floor level, on the surface upon which casters 15 and 16 are supported.

The knee supporting means is a flexible sheet material 28 fastened to inner strip 11 by means of clamping strips 26 at the front 13 and 27 at the sides adjacent the rear portion 14 preferably adjacent L-beam sections 22. Clamping strips 26 and 27 are fastened to inner strip 11 by bolts 29. Preferably edges of sheet material 28 are clamped between clamping strips 26 or 27 and inner strip 11. Usually three spaced locations for clamping sheet material 28 to inner strip 11 are sufficient to provide secure attachment. Sheet material 28 may be leather, fabric, plastic sheet, or the like. Proper spacing and sizing of sheet material 28 will permit its lowest elevation, when supporting a knee, to be a minimum distance, e.g., at least ⅛ inch above floor level.

An additional optional feature of this invention is the provision of one or more pouches or open-top pockets 30 which are placed in the available spaces between inner and outer strips 11 and 12. Pouches 30 may be made of leather, fabric, plastic sheeting, or the like, and preferably are made with a stop lug 40 that will support the pouch 30 and prevent it from falling downwardly without need for bolting the pouch 30 to strips 11 and/or 12. Flanges 20 may also be employed. Generally, pouches 30 are used to carry any small items frequently needed by the worker, e.g., tools, nails, screws, power drill, drill bits, etc. The knee support of this invention can also be built with permanent pouches 30 that are not easily removable from the knee support frame.

Figure 4:
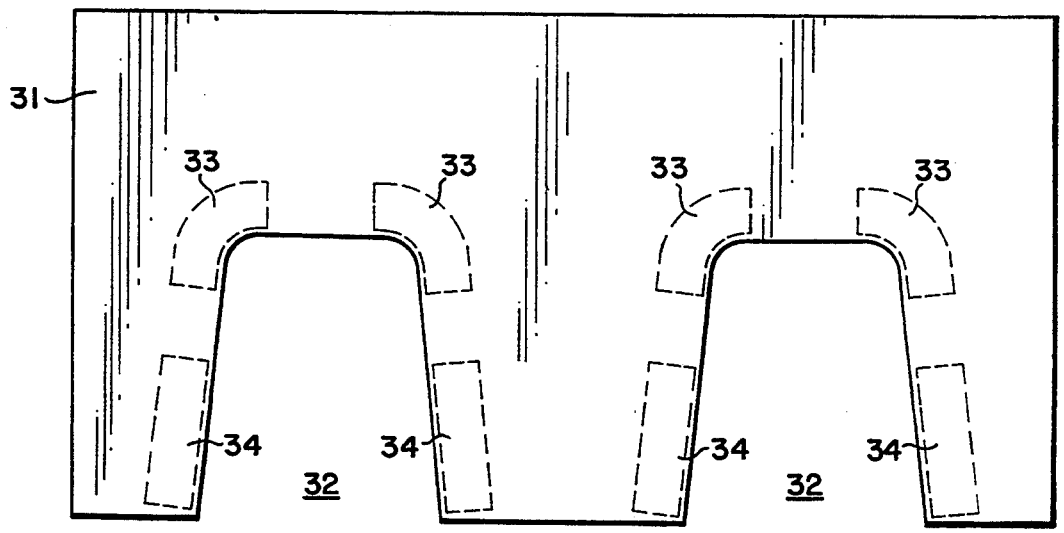
FIG. 4 is a top plan view of a plate for attaching two knee supports of this invention.
Figure 5:
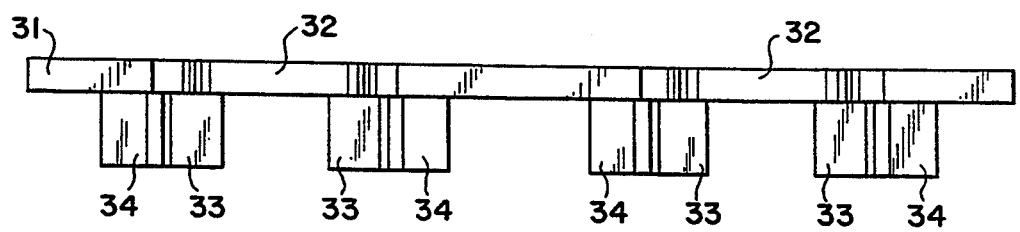
FIG. 5 is a rear elevational view of the plate of FIG. 4.

In some use applications, it is desirable to connect two knee support devices to each other for ease of handling. In FIGS. 4 and 5 there is shown a plate or sheet 31 which serves to join two knee support devices into a non-adjustable configuration. Plate 31 has two horseshoe shaped openings 32 which closely, if not exactly, conform to the central opening of the knee support device, generally defined by inner strip 11. Openings 32 admit the knees of the worker to the sheet material sling 28 for each knee. Plate 31 is frictionally engaged with two knee support devices by way of tabs 33 which depend downwardly from the lower surface of plate 31 and frictionally contact inner and outer strips 11 and 12 generally in the same spaces where 30 would be positioned. In this embodiment any tool holders, nail cups, or the like will be attached to any available area on the top surface of plate 31.

Figure 6:
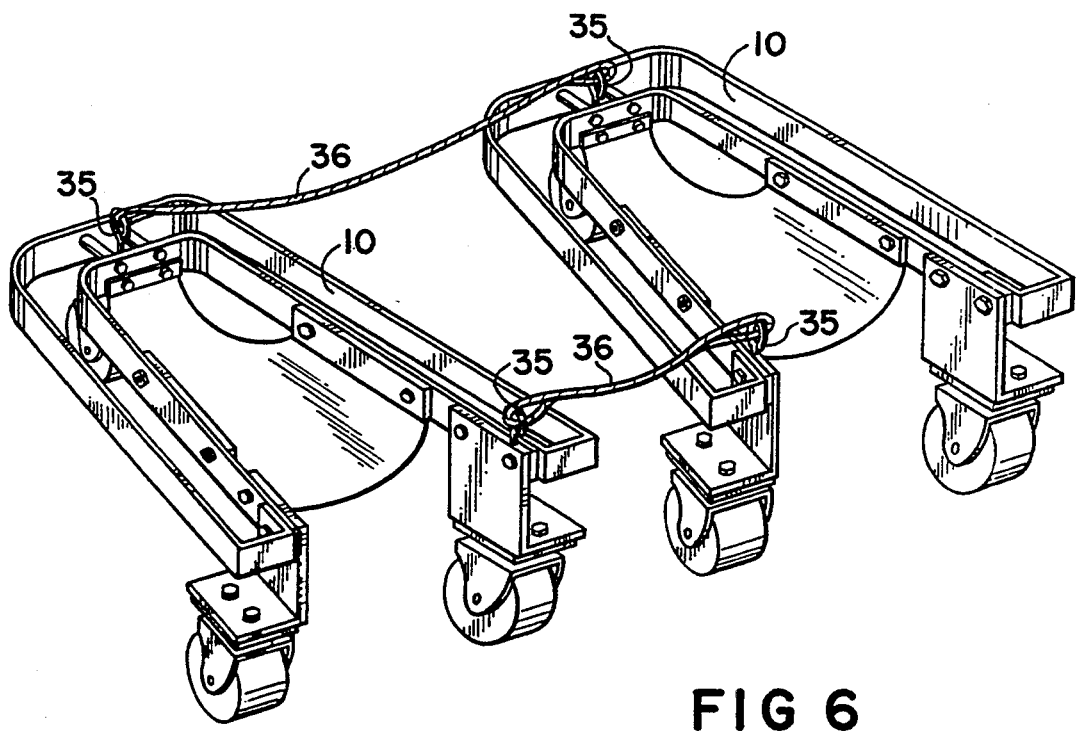
FIG. 6 is a perspective view of two knee supports tied together with a rope.

In FIG. 6 there is shown another way to keep two knee support devices from becoming separated. Here, one or two eye bolts 35 are attached to each knee support device at any convenient location, e.g., at one or two of L-beams 21 and 22. Suitable ropes, chains, wires 36 can be attached to respective eye bolts 35 so as to keep two knee support devices together. Any other suitable connecting means can be used for this purpose.

Figure 7:
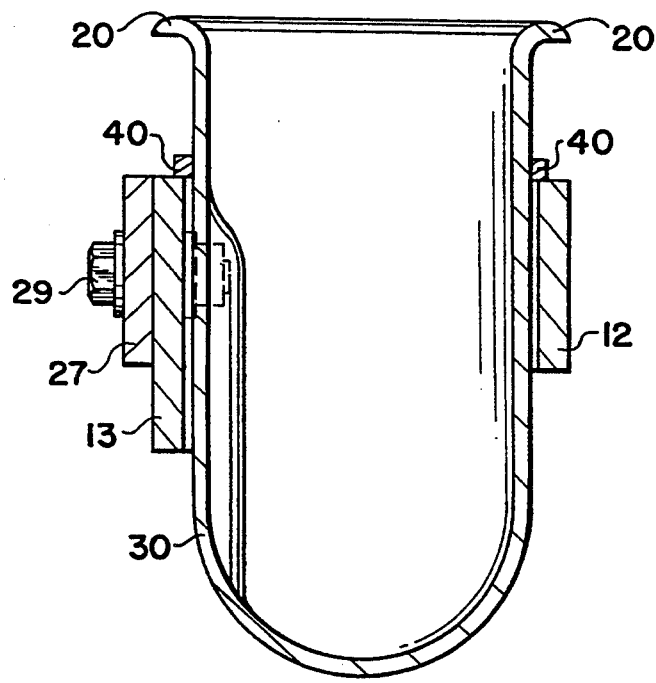
FIG. 7 is a cross-sectional view taken at 7—7 of FIG. 1.

FIG. 7 shows how pouch 30 may be disposed between inner and outer strips 11 and 12. Each pouch 30 may have a stop means 40 which keeps pouch 30 from falling downward from strips 11 and 12 when loaded with tools or other items carried in the pouch 30. Flanges 20 may be employed in place of, or in addition to, stop means 40. If desired, pouch 30 may be bolted to or cemented to the strips 11 and 12.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A pair of mobile knee supports comprising two identical wheeled vehicles, each designed to receive and support a human knee; each said support including an outer U-shaped strip and an inner U-shaped strip spaced concentrically apart, three spaced casters located respectively at the center of said strips and at both ends of said strips; a rigid support for each said caster depending downwardly from at least one of said strips; and a flexible knee support sheet material suspended from said inner strip and adapted to receive said knee and to suspend the knee above the lowest level of said casters.

2. The knee supports of claim 1 wherein said rigid supports for said casters are short lengths of L-beam positioned to have a vertical leg rigidly attached to said inner U-shaped strip and a horizontal leg for attachment to one said caster.

3. The knee support of claim 1 wherein said knee support sheet material is a textile fabric.

4. The knee support of claim 1 which additionally includes at least one pouch suspended between adjacent sections of said inner and outer U-shaped strips and adapted to hold small items used by the person using said knee support.

5. The knee support of claim 4 wherein said pouch is an open-top container made of molded plastic.

6. The pair of knee supports of claim 1 which are held in a fixed spaced relationship by a rigid sheet having downwardly depending tabs adapted to frictionally engage portions of said knee supports and having openings to permit access of two knees to said respective pair of knee supports.

7. The pair of knee supports of claim 1 which additionally include at least one eye bolt on each said knee support adapted to be joined by a short section of rope.

8. A knee support device comprising two horseshoe-shaped strips concentrically spaced apart from each other at the same general horizontal elevation to form an inner strip and an outer strip, at least three rigid spacer members to maintain the spacing between said strips; three spaced L-beam members each having a vertical leg and a horizontal leg; the vertical legs being rigidly attached, respectively, to said inner strip and said horizontal legs being spaced below said inner strip and positioned to lie in a common plane, a caster attached to, and depending downwardly from, each said horizontal leg; a flexible sheet material sling attached to said inner strip adjacent said L-beams and adapted to receive a knee therein and support it at an elevation above the lowest elevations of said casters; and at least one tool-carrying pouch suspended between said outer and inner strips adjacent said sling.

9. The device of claim 8 further comprising releasable means for attaching said sling to said inner strip.

10. The device of claim 9 wherein said sling includes a forward leg and a pair of oppositely disposed side legs, said inner strip having a middle portion and a pair of spaced opposite side portions, said releasable means including a plurality of spaced clamps for attaching said forward leg to said middle portion and said side legs respectively to said opposite side portions of said inner strip.

11. A mobile knee support apparatus comprising a pair of identical wheeled vehicles, each said vehicle being designed to receive and support respective knees of a user, each said vehicle including a U-shaped framework having a rigid outer member with a pair of spaced side wall portions and a front wall portion and a completely open space bounded by said side and front wall portions, said side wall portions terminating in opposite free end portions, three spaced casters attached respectively to said front wall portion of said framework and to said free end portions, and a flexible knee support sheet material suspended from said front and side wall portions of said framework, said sheet material having a lower surface portion extending downwardly from each front and side wall portion to a position in the general plane of said casters to position knees of a user closely adjacent to and above a surface on which said casters are rotatably supported.

12. The apparatus of claim 11 wherein said knee support sheet material is a textile fabric.

13. The apparatus of claim 11 further comprising L-beam short lengths positioned to provide a vertical leg rigidly attached to said U-shape framework and a horizontal leg extending outwardly for supporting respective said caster.

14. The apparatus of claim 11 further comprising at least one eye bolt on each said framework, a short section of rope attached to said eye bolts to limit distance between said vehicles.

15. The apparatus of claim 11 wherein said framework includes an outer U-shaped strip and an inner U-shaped strip spaced concentrically apart, said framework includes three rigid supports connected to and depending downwardly from at least one said strips, said casters being mounted respectively to said rigid supports.

16. The apparatus of claim 15 which additionally includes at least one pouch suspended between said inner and outer U-shaped strips and adapted to hold small items for a user of said apparatus.

17. The apparatus of claim 16 wherein said pouch has a closed bottom, and stops on said pouch to position said bottom above a surface on which said casters are rotatably supported.

18. The apparatus of claim 15 further comprising a rigid sheet having downwardly depending legs adapted to be positioned between said strips of each said vehicle, said sheet having a near edge with a pair of spaced notches positioned above said sheet material to permit free access thereto during use of said vehicles.

19. The apparatus of claim 1 further comprising releasable means for attaching said support sheet material to said framework.

20. The apparatus of claim 19 wherein said releasable means includes a plurality of spaced clamps, said sheet material having a forward reduced section and a pair of oppositely reduced sections, said clamps attaching said forward reduced section to said middle portion of said framework and attaching said oppositely reduced sections to said opposite end portions of said framework.

* * * * *